Dec. 18, 1928.
T. Z. CARPENTER
1,695,453
GAUGE
Filed March 10, 1922
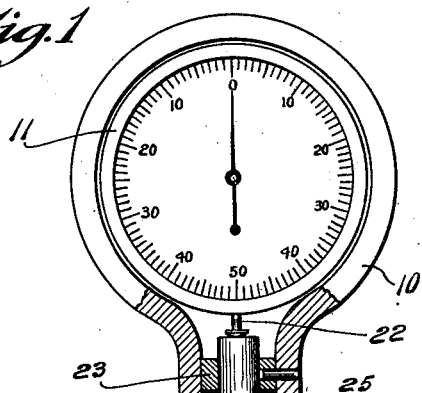
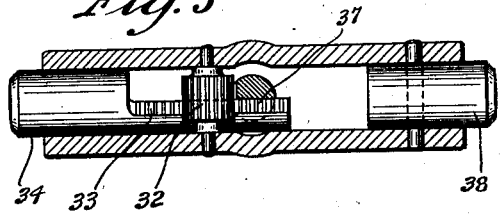
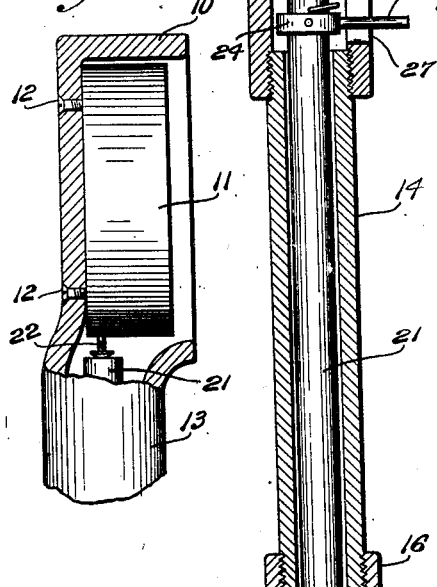
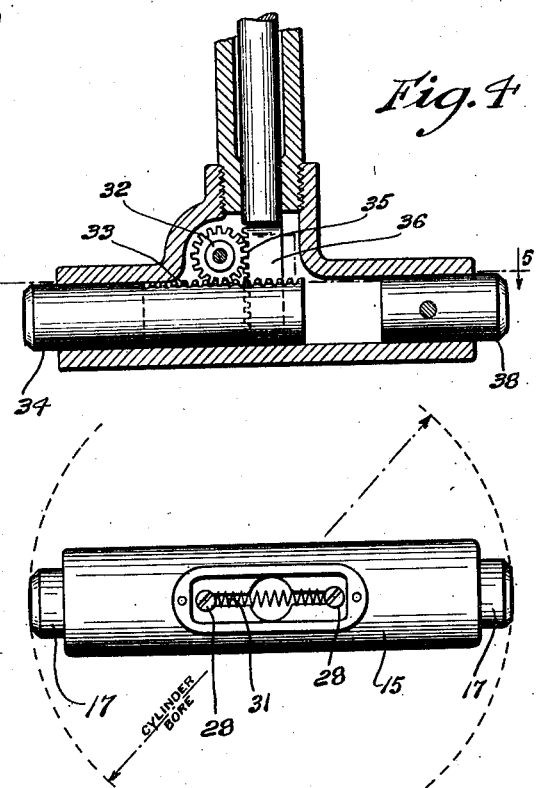
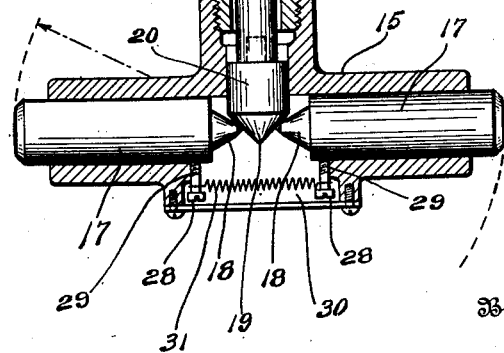
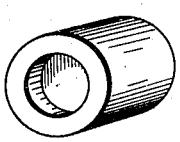
Inventor
Teunaushi Z. Carpenter
By Howard E. Barlow
Attorney Patented Dec. 18, 1928.

1,695,453

UNITED STATES PATENT OFFICE.

TEUNAUSKI Z. CARPENTER, OF PROVIDENCE, RHODE ISLAND.

GAUGE.

Application filed March 10, 1922. Serial No. 542,612.

This invention relates to gauges more particularly designed for taking internal measurements of cylinders but which may be used for accurately determining the bore of any hole or opening, and in an improvement of my prior Patent Number 1,329,456, issued February 3, 1920; and the object of this invention is to provide an improved and simplified construction of such a gauge adapted to be readily placed within the bore of a cylinder for the purpose of obtaining an accurate measurement to indicate whether or not the bore of a cylinder is out of true either diametrically or in the direction of its length.

A further object of the invention is to provide two or more feeler members having their engaging ends each rounded on a radius substantially that of the bore to be measured.

A still further object of the invention is to provide relatively broad engaging ends on the feelers and to round the end surfaces circularly in a horizontal plane relative to the standard member of the gauge to conform to the bore to be measured, and also to round these ends vertically relative to the axis of the standard so that even though the gauge is tilted or set out of axial alignment with the cylinder the reading on the dial will still be correct.

With these and other objects in view, the invention consists of certain novel features of construction, as will be more fully described, and particularly pointed out in the appended claims.

In the accompanying drawings:

Figure 1 is a front view of my improved gauge partially in section illustrating the operating mechanism therein.

Figure 2 is a central sectional side elevation of the dial-receiving head portion of the gauge.

Figure 3 is an end view from the under side of the gauge with the plate removed, also showing the rounded feeler ends to conform to the diameter of the bore to be measured.

Figure 4 is a modification showing a central side elevation of a gauge in which the feeler members and the rod are connected to operate in unison by engagement with the pinion.

Figure 5 is a sectional view on line 5—5 of Figure 4.

Figure 6 is an extension thimble adapted to fit over the ends of the feeler members for lengthening the feelers to measure bores of different diameters.

It is found in practice desirable to produce a simple, practical and inexpensive dial indicator with a single pair of feelers for accurately measuring the bore of a cylinder and the like and that without the use of a centralizing attachment. By the use of a single pair of feelers it will be seen that it is only necessary that the gauge shall be given a half turn in the cylinder in order to obtain the measurements of its entire diameter instead of a full turn which is the case where more than two feeler points are employed and by forming a substantially spherical engaging surface on the extremity of the feelers the device may be tilted or set out of alignment with the rest of the cylinder without affecting the true reading of the gauge. The following is a detailed description of one means by which the above results may be accomplished:—

With reference to the drawings, 10 designates a hollow, circular head-member with its front wall removed providing a chamber into which the dial indicator 11 is mounted and secured by means of screws 12, the head being provided with downwardly extending tubular neck portion 13 into the lower end of which is threaded a tubular member 14. At the lower end of this member is secured a laterally-extending tubular cross member 15 forming a pair of feeler supports and having a neck portion 16 into which the member 14 is threaded.

In this cross member are mounted two feeler fingers 17, each being provided with conically-shaped inner ends 18 which engage the cooperating conical end 19 of the bearing member 20 which is fixed on the lower end of the movable transmitter rod 21, which rod is operatively mounted in the tubular member 14. The upper end of this rod engages the dial operating pin 22 by which the movement of the feeler members 17 is transmitted to the dial to indicate in thousandths or other unit of measurement the exact size of the bore of the cylinder being measured.

In order to maintain a constant outward pressure on the feeler members and keep them always in contact with the rod 21, I have mounted a fixed bearing member 23 in the upper end of the neck 13 and I have fixed a collar 24 to the rod 21. I have inserted a spring 25 between this bearing and the collar to act upon the rod and press it normally downwardly against the inner ends of the feelers.

In order to be able to operate this rod independently of the movement of the fingers 17, I have provided an operating pin 26 which extends through an opening 27 in the neck 13, the inner end of which is fastened to the collar 24.

To limit the outward motion of these feelers 17 I have provided stop screws 28 which abut against the end walls 29 of the opening 30 and these feelers are drawn normally inwardly by the light spring 31 to further assist in holding the inner ends of the feelers in contact with the cone 19.

The outer engaging surfaces or extremities of these feeler members are preferably formed with a spherical surface so as to conform substantially to the inner surface of the cylinder being measured as illustrated by dotted lines in Figure 3, these ends being preferably rounded on the same radius in a vertical direction relative to the axis of the cylinder whereby the standard may be rocked from side to side to assist in causing the oppositely-disposed feelers to take the greatest diameter of the bore being measured also by providing the comparatively broad rounding surface of these feelers a comparatively slight lateral movement or positioning of the device out of alignment with the axis of the bore, will not affect the accurate reading of the dial. In other words, ordinarily a dial of this character where the feeler points are not formed on the arc of a circle whose radius is not that of the bore it is necessary to provide a centralizing device in order to bring the dial standard into accurate axial alignment with the cylinder in order to obtain an accurate reading which centralizing device is obviated by my improved construction.

In some instances instead of employing conically-shaped inner ends for controlling the movement of the feelers, I provide a pinion 32 which engages rack teeth 33 on the edge of the feeler 34 and also rack teeth 35 on the rod 36, one half of both the feeler and the rod being cut away as at 37 to permit one to pass the other.

In this particular arrangement one of the feelers 38 is fixed. When it is desired to extend the length of the feelers, a thimble such as that illustrated in Figure 6, corresponding to the shape of the feeler, may be placed over the feelers for measuring the diameter of the bore of a larger cylinder.

My improved gauge is extremely simple and practical in construction and effective in its operation and by its use the accurate measurement of the bore of a cylinder may be obtained in the minimum amount of time.

The foregoing description is directed towards the construction illustrated, but I desire it to be understood that I reserve the privilege of resorting to all the mechanical changes to which the device is susceptible, the invention being defined and limited only by the terms of the appended claims.

I claim:

1. A bore measuring indicating gauge comprising an indicator having an operating pin, a transmitting rod in engagement therewith, a pair of oppositely disposed aligned feelers extending laterally of said rod and having tapered ends engaging the opposite end thereof, a spring for moving the rod into engagement with said feelers, the work-engaging extremities of said feelers being rounded to form a portion of a sphere of substantially the radius of the bore to be measured.

2. A gauge having a casing comprising a hollow head to receive a dial gauge, a pair of feeler supports in axial alignment, a tubular means connecting said head and feeler supports, a dial gauge in said head, a motion-transmitting rod in said member having a cone-shaped pointed end, a pair of feeler members movably mounted in said supports, a spring for causing said feelers to engage said cone-shaped end, said feelers and rod cooperating whereby an endways movement of said feelers causes the gauge to indicate the extent of said movement.

In testimony whereof I affix my signature.

TEUNAUSKI Z. CARPENTER.